May 3, 1960  E. H. PHILLIPS  2,934,954
HUMIDITY INDICATING DEVICE AND LOW
PRESSURE STATIC SEAL THEREFOR
Filed July 13, 1955
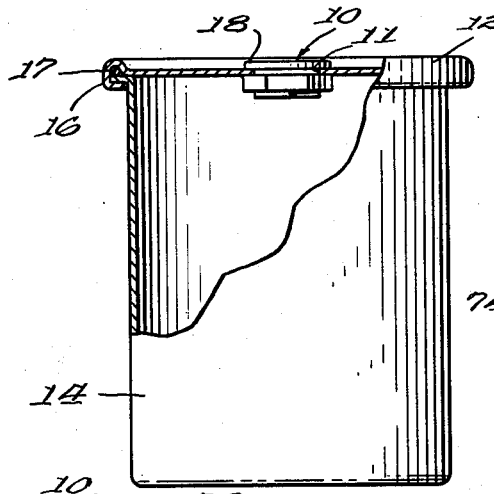
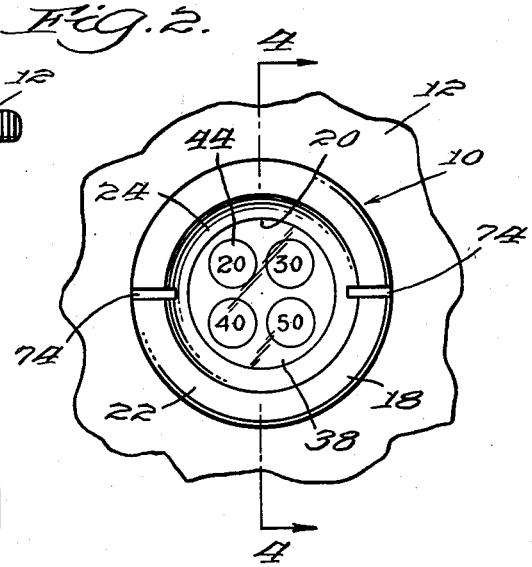
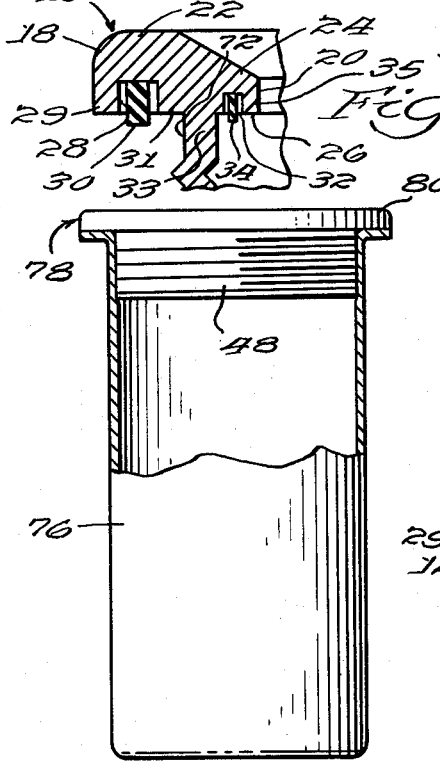
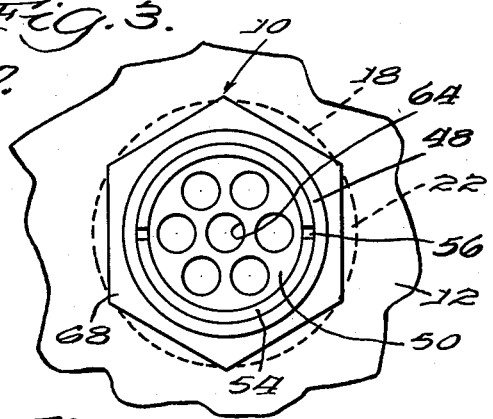
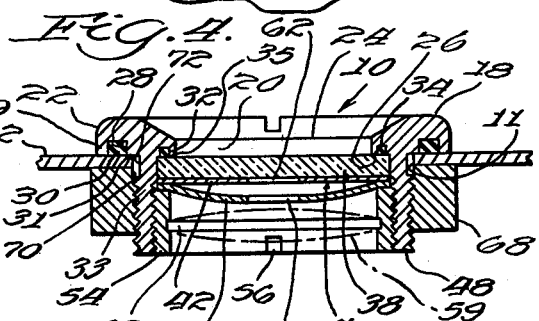
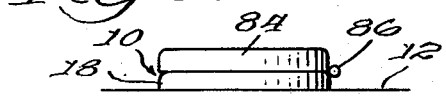
INVENTOR.
Eugene H. Phillips.
BY
Thomas P. Mahoney.
Atty.

2,934,954

HUMIDITY INDICATING DEVICE AND LOW PRESSURE STATIC SEAL THEREFOR

Eugene H. Phillips, Glendale, Calif., assignor to Lennan Lights, Inc., Burbank, Calif., a corporation Application July 13, 1955, Serial No. 521,739

1 Claim. (Cl. 73—335)

This invention relates to a humidity indicating device and, more particularly, to a humidity indicating device which is adapted to be used in conjunction with various types of containers in order that an individual inspecting the containers may determine, without opening the containers, what the relative humidity existing within the containers may be.

Containers of the character under consideration are usually formed from sheet metal, such as steel, and usually have a top fastened thereto by means of spinning, welding, or the like. One of the major problems encountered in the installation of a humidity indicating device in the walls or tops of such containers has been the fact that low pressure differentials frequently exist between the interiors of the containers and the ambient air. Therefore, it is absolutely essential that an optimum seal be created between the wall of the container in which the humidity indicating device is located and the device itself. Moreover, the pressure differential problem is complicated by the fact that it is necessary to provide a viewing glass in the humidity indicating device and this, also, poses a sealing problem since it is not feasible to exert more than a certain amount of pressure on the periphery of the viewing glass.

It is, therefore, an object of my invention to provide a humidity indicating device adapted to be utilized in conjunction with an opening in a container which is incorporated in a body having inwardly and outwardly radiating flanges and a centrally located bore, the outwardly radiating flange being provided with a seal adapted to engage a continguous area of the container and the inwardly radiating flange being provided with a seal adapted to engage the periphery of the viewing glass located in the centrally located bore of the body of the indicating device.

Attempts have been made in the past to utilize humidity indicating devices of conventional construction in conjunction with flat, rubber gaskets interposed between flat faces on the device and the contiguous area on the container in which the indicating device was installed. However, such sealing expedients have been found to be completely unsatisfactory since the pressure exerted upon the gaskets tends to extrude and deform the same beyond their elastic limits and the resulting inequalities in the sealing achieved permitted the ingress of moisture past the seal of the humidity indicating device and thus permitted the ingress of air and moisture into the interior of the container with which the device was associated.

Moreover, the low pressure differential between the ambient air and the interior of the container creates a sealing problem since the seals in the body must function statically to prevent leakage of ambient air into the container.

Another object of my invention is the provision of a device of the aforementioned character wherein both the outer and inner static seals utilized, respectively, against the contiguous area of the container and the periphery of the viewing glass are incorporated in annular first and second seal receiving openings and are of substantially the same configuration and size as the openings when deformed therein by engaging an adjacent surface of the container. Therefore, when the outer seal is tightened against the contiguous area of the container, it cannot be deformed beyond its elastic limit which would cause it to set and lose its sealing efficacy.

Moreover, because of the substantially rectangular cross section of the gasket or seal, an area, rather than linear sealing contact is achieved and minute discrepancies in the surface of the contiguous area of the container are thus accommodated.

Of course, one of the most important aspects of the device of my invention is the provision of the viewing glass in the central bore of the body of the device so that the indicator may be viewed with ease from the exterior of the container.

A further object of my invention is the provision of a humidity indicating device of the aforementioned character wherein there is mounted in the bore of the body of the device a disc of paper constituting a reversible humidity indicator, said disc being impregnated with several cobalt chloride solutions and bearing on its surface a spot having a predetermined color thereupon. By matching the color of the cobalt chloride impregnated paper to the color of the spot, the relative humidity percentage existing within the container can be readily ascertained.

Another object of my invention is the provision of a humidity indicator of the aforementioned character wherein there is incorporated a non-reversible humidity indicator which can be utilized separately or in conjunction with the reversible humidity indicator to indicate the maximum relative humidity which has been reached inside the container.

An additional object of my invention is the provision, in a device of the aforementioned character, of an isolating shield which is utilized behind the humidity indicator to prevent physical contact of the contents of the container with the humidity indicator and thus to eliminate the possibility of contamination or damage thereof.

It is sometimes desirable to ascertain the physical condition of the contents of a container in which the humidity device of my invention is in corporated and I, therefore, provide a centrally located opening in the indicator disc and in the protective shield therefor so that an individual inspecting the container may visually ascertain the condition of the contents of the container or the non-reversible humidity indicator through the registering openings in the indicator disc and the shield therefor.

One of the major problems encountered in the use of humidity indicating devices incorporating cobalt chloride humidity indicators is the fact that prolonged exposure to light and sunlight materially affects the dyes incorporated in the humidity indicator disc.

A further object of my invention is the provision of a humidity indicating device of the aforementioned character wherein there is incorporated a removable cover adapted to shield the humidity indicator disc from the light rays and thus to prevent the leaking out or fading of the dyes incorporated in the disc.

A further object of my invention is the provision of a humidity indicating device which, instead of being mounted in an opening in a wall of the container with which it is associated, can be utilized as a closure for the container, thus eliminating the need for a cover or top on the container.

Other objects and advantages of my invention will be apparent from the following specification and the accompanying drawing which is for the purpose of illustration only and in which:

Fig. 1 is a front elevational view showing a humidity indicating device constructed in accordance with the teachings of my invention installed in the top wall or cover of a container;

Fig. 2 is a top plan view of a humidity indicating device;

Fig. 3 is a bottom plan view of the humidity indicating device;

Fig. 4 is a horizontal, sectional view taken on the broken line 4—4 of Fig. 2;

Fig. 5 is a partly sectional view of a humidity indicating device designed to serve as the top wall cover of the container with which it is associated;

Fig. 6 is an elevational view showing the provision of a hinged cover on the body of the humidity indicating device; and Fig. 7 is an enlarged, fragmentary, sectional view of the body of the humidity indicating device.

Referring to the drawing and particularly to Figs. 1–4 thereof, I show a humidity indicating device 10 which is mounted in an opening 11 in a top wall or cover 12 of a container 14, said top wall or cover being secured to the container 14 in airtight relationship by means of a spun-over edge 16 in which is incorporated a sealing member 17. However, the details of the affixation of the top wall or cover 12 to the container 14 constitute no part of my invention and all that is necessary is that the relationship between the cover 12 and the container 14 be an airtight one.

The humidity indicating device 10 is constituted, in part, by a body 18 formed from aluminum alloy or other metal and having a centrally located bore 20 therethrough. The body 18 of the humidity indicating device 10 is provided with a first, outwardly radiating flange 22 and a second, inwardly radiating flange 24. The second flange 24 projects beyond the wall of the bore 20 in the body 18 and defines a shoulder 26 in said bore.

There is formed in the underside of the outwardly radiating flange 22 a first, annular, seal-receiving groove or opening 28 which is of substantially rectangular cross section and which is adapted to receive a sealing member 30 which is, when not deformed, of smaller width than the opening 28 and projects beyond the confines thereof, as best shown in Fig. 7 of the drawing.

A second, annular, seal-receiving groove or opening 32 is formed in the inwardly directed flange 24 and is of substantially rectangular cross section and adapted to receive a sealing member 34 which is, when not deformed of smaller width than the opening 32 and projects beyond the confines thereof, as best shown in Fig. 7 of the drawing.

It will be noted that the walls 29, 31, 33 and 35 defining the openings 28 and 32, respectively, all terminate on the same plane as best shown in Fig. 7 of the drawing. This is particularly important in the case of the walls 29 and 31 which engage the container cover 12.

Located in the bore 20 and abutting on the shoulder 26 and the sealing member 34 is a viewing glass 38, said glass having smooth, preferably ground, surfaces and being of the low expansion, heat-resisting type. Mounted behind and engaging the inner surface of the viewing glass 38 is a humidity indicator 40 constituted by a disc 42 of blotting paper, or the like, impregnated with several spots of cobalt chloride solution and having printed upon the outer surface of said spots indicia 44 indicating the percentage of relative humidity existing within the container 14. In the present embodiment of the invention, the indicia 44 are constituted by individual spots of different shades which bear numerals of different quantities proportional to the intensity of the shades and the humidity indication is attained by comparison between the different spots and the background of the paper disc 42.

Formed integrally with and constituting a part of the body 18 of the humidity indicating device 10 is an axially oriented skirt 48 which is both internally and externally threaded and which constitutes a prolongation of the bore 20 in said body. Located in the bore 20 behind the humidity indicator disc 42 is a perforated, metallic, protective shield 50, said shield being designed to isolate the humidity indicator 40 from physical contact with the contents of the container 14. A threaded retainer ring 54 engages the internal threads on the skirt 48 and maintains the viewing glass 38, the humidity indicator 40, and the protective shield 50 in the bore 20. The retainer ring 54 is provided with notches 56 engageable by a spanner wrench and is also provided with an inwardly opening annular groove 58 for the reception of a capsule 59, Fig. 4, containing a hygroscopic or other material to act as an irreversible humidity indicator in conjunction with, or in lieu of, the paper disc 42. The capsule may incorporate a silica gel treated with a cobalt chloride solution which will respond to the maximum humidity level reached inside the container 14.

In those installations wherein it is desirable to visually inspect the contents of the container 14, there is provided in the humidity indicator 40 and, more particularly, in the paper disc 42 constituting the same, a centrally located opening 62 which is registered with one of the openings 64 in the protective shield 50. Therefore, an inspector can view the contents of the container 14 through the registered openings 62 and 64 in the humidity indicator 40 and the protective shield 50 therefor.

The body 18 of the humidity indicating device 10 is maintained in operative relationship with the cover 12 of the container 14 by means of a hexagonal lock nut 68, said nut being provided with threads which are engageable with the threaded periphery of the skirt 48. The lock nut 68 is, as best shown at 70 in Fig. 4 of the drawing, provided with a relief or undercut portion which is juxtaposed to a similar relief indicated at 72 provided in a contiguous portion of the body 18. In order to facilitate the mounting of the humidity indicating device 10 in the opening 11 in the top 12 of the container 14, spanner notches 74 are provided in the body 18.

In assembling the humidity indicating device 10, the seal 34 is first located in the second, seal-receiving opening 32 and the viewing glass 38, the humidity indicator 40 and the shield 50 inserted in the bore 20 of the body 18 in the order specified. The retainer ring 54 is then threadedly engaged with the interior wall of the skirt 48 and is rotated therein to cause the periphery of the outer face of the viewing glass 38 to impinge on the shoulder 26 and the seal 34.

As the seal 34 is deformed by the axial load imposed on it by the retainer ring 54, the area contact of the seal 34 with the glass 38 increases and the seal 34 also is deformed into a shape more closely approximating that of the opening 32 in which it is located, as best shown in Fig. 4 of the drawing. Since the seal 34 is so sized that, when completely deformed, it will lie entirely within the opening 32 with only its undersurface engaging the glass 38, the possibility that the seal 34 will be deformed beyond its elastic limit is avoided and the elasticity of the seal insures a maximum sealing effort on the glass 38.

Since the volume of the sealing member 34 in its deformed state is substantially equal to the volume of the seal-receiving opening 32 in which it is located, the possibility of the by-passing of ambient air around the sealing member 34 and into the interior of the container 14 is eliminated. Moreover, since the sealing member 34 is of substantially rectangular or square cross section, a large sealing area is provided which eliminates the possibility of by-passing caused by inequalities in the adjacent surface of the viewing glass 38 or the sealing member itself.

After the humidity indicating device 10 has been assembled in the above described manner, it is ready for insertion in the opening 11 in the top 12 of the container 14. Prior to insertion, the sealing member 30 is inserted in the first, seal-receiving opening 28 and the skirt 48 of the body 18 is inserted through the opening 11. Subsequently, the hexagonal lock nut 68 is screwed upon the threaded exterior of the skirt 48 and the body 18 and hexagonal nut 68 rotated relative to each other.

As the lock nut 68 is screwed upon the skirt 48, the seal 30 is deformed by engagement with the adjacent area of the cover 12. When the ends of the walls 29 and 31 finally engage the cover 12, the seal 30 is deformed into a shape and size approximating that of the opening 28 but not beyond its elastic limit since engagement of the ends of the walls 29 and 31 with the cover 12 prevents further deformation of the seal 30. Therefore, the seal 30 remains elastic and the area contact thereof with the cover 12 insures optimum sealing at all times.

Since the sealing member 30 is of substantially rectangular or square cross section when deformed, area, rather than linear, sealing is achieved.

The relieved portions 70 and 72 in the hexagonal nut 68 and the body 18 of the humidity indicating device 10 permit the lock nut to draw the seals 30 and 34 into contact with even the thinnest sheet metal constituting the cover 12 of the container 14.

There is shown in Fig. 5 of the drawing a container 76, said container being provided with a cover 78 which is constituted by a humidity indicating device 80 constructed in accordance with the teachings of my invention. Unlike the previously discussed embodiment of my invention, there is no gland nut 68 provided on the threaded skirt 48 of the humidity indicating device 80 since the humidity indicating device is maintained in threaded relationship with the opening of the container 76. In all other respects, the construction of the humidity indicating device 80 is identical with that of the previously discussed embodiment of the invention and the details of the construction, therefore, need not be discussed.

Shown in Fig. 6 of the drawing is a cover 84 hingedly connected at 86 to the body 18 of the humidity indicating device 10. The cover 84 is adapted to shield the humidity indicator 40 from the rays of the sun and to prevent the fading of the dyes incorporated in said humidity indicator.

I thus provide by my invention a humidity indicating device which is characterized by optimum sealing with the contiguous area of the container in which it is incorporated and which thus prevents the ingress of air and moisture into said container. Moreover, the humidity indicating device of my invention is characterized by its simplicity of construction and the ease with which the percentage of relative humidity within the container may be ascertained.

Furthermore, there is disclosed a static seal having particular merit in low pressure applications because of the area, rather than linear, sealing action thereof and because the sealing member or members incorporated therein cannot be deformed beyond the elastic limits of the materials from which they are fabricated.

Other aspects and advantages of the invention will have been made apparent from the previously discussed embodiments thereof.

I claim as my invention:

In a humidity indicating device for insertion in an opening in a wall of a container, the combination of: a cylindrical body having a centrally located bore therein and an outwardly radiating flange provided with a first, seal-receiving groove, said body having an inwardly radiating flange provided with a second, seal-receiving groove and defining a shoulder in said bore, said flanges being coplanar and said grooves being of uniform width from the top to the bottom thereof; first and second seals located in said first and second grooves, said first seal engaging the area of said wall continguous to said opening, said first and second seals being of uniform width from the top to the bottom thereof, said seals being of smaller width than said grooves when uncompressed and filling said grooves when compressed; a viewing glass located in said bore and abutting on said second seal and said shoulder; and a humidity indicator retained in said bore against said glass.

References Cited in the file of this patent

UNITED STATES PATENTS

| | | |
|---|---|---|
| 1,331,005 | Duncan | Feb. 17, 1920 |
| 1,956,683 | Hewitt | May 1, 1934 |
| 2,258,521 | Thompson | Oct. 7, 1941 |
| 2,390,445 | Mercier | Dec. 4, 1945 |
| 2,613,845 | Swerdlow | Oct. 14, 1952 |
| 2,657,825 | Erikson | Nov. 3, 1953 |
| 2,722,043 | Nenzell | Nov. 1, 1955 |
| 2,744,654 | Swerdlow | May 8, 1956 |
| 2,815,662 | Thomas | Dec. 10, 1957 |

FOREIGN PATENTS

| | | |
|---|---|---|
| 518,397 | Germany | Feb. 14, 1931 |